United States Patent
Czamara et al.

(10) Patent No.: US 10,055,596 B1
(45) Date of Patent: Aug. 21, 2018

(54) DATA PROTECTION SYSTEM

(71) Applicant: Amazon Technologies, Inc., Seattle, WA (US)

(72) Inventors: Michael Phillip Czamara, Seattle, WA (US); Brock Robert Gardner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/733,823

(22) Filed: Jun. 8, 2015

(51) Int. Cl.
| | | |
|---|---|---|
| G06F 21/00 | (2013.01) | |
| G06F 21/60 | (2013.01) | |
| G06F 21/78 | (2013.01) | |
| G06F 21/88 | (2013.01) | |
| G06F 21/75 | (2013.01) | |
| G06F 21/87 | (2013.01) | |

(52) U.S. Cl.
CPC ............ *G06F 21/604* (2013.01); *G06F 21/75* (2013.01); *G06F 21/78* (2013.01); *G06F 21/87* (2013.01); *G06F 21/88* (2013.01)

(58) Field of Classification Search
None
See application file for complete search history.

(56) References Cited

U.S. PATENT DOCUMENTS

| | | | |
|---|---|---|---|
| 5,748,084 A | 5/1998 | Isikoff | |
| 6,039,637 A | 3/2000 | Hutchison et al. | |
| 6,182,223 B1 | 1/2001 | Rawson | |
| 7,099,110 B2 | 8/2006 | Detzler | |
| 2003/0105904 A1* | 6/2003 | Abbondanzio | G06F 13/409 710/302 |
| 2004/0252628 A1* | 12/2004 | Detzler | G06F 21/554 369/288 |
| 2005/0021468 A1* | 1/2005 | Stockton | G06F 21/6218 705/51 |
| 2010/0154027 A1* | 6/2010 | Sobel | G06F 21/552 726/1 |

(Continued)

FOREIGN PATENT DOCUMENTS

| | | |
|---|---|---|
| WO | 2002095550 | 11/2002 |
| WO | 2008020932 | 2/2008 |

OTHER PUBLICATIONS

U.S. Appl. No. 13/625,507, filed Sep. 24, 2012, Matthew S. Garman, et al.

(Continued)

*Primary Examiner* — Eleni A Shiferaw
*Assistant Examiner* — Andrew J Steinle
(74) *Attorney, Agent, or Firm* — Robert C. Kowert; Meyertons, Hood, Kivlin, Kowert & Goetzel, P.C.

(57) ABSTRACT

A storage device of a data center may protect data stored on a storage medium of the storage device using a data security mechanism. The data security mechanism may include a connection detection component and a storage destruction mechanism. The connection detection component may be configured to detect whether the storage device is physically connected to another device (e.g., a storage server) of a data center. The storage destruction mechanism may be configured to destroy at least a portion of the data stored on the storage device in response to the connection detection component detecting that the storage device is physical disconnected from the other device.

20 Claims, 10 Drawing Sheets

(56) References Cited

U.S. PATENT DOCUMENTS

| | | | |
|---|---|---|---|
| 2010/0294865 A1 | 11/2010 | Wozny | |
| 2013/0173829 A1* | 7/2013 | Chan | G06F 21/00 710/17 |
| 2013/0339738 A1 | 12/2013 | Shaw | |
| 2014/0253708 A1* | 9/2014 | Allen | G08B 21/24 348/77 |
| 2014/0263216 A1* | 9/2014 | Clark | B23Q 3/069 219/121.71 |
| 2015/0293864 A1* | 10/2015 | Hill | G06F 13/4221 710/109 |

OTHER PUBLICATIONS

U.S. Appl. No. 14/733,831, filed Jun. 8, 2015, Brock Robert Gardner, et al.

\* cited by examiner

DATA PROTECTION SYSTEM

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide "full service" facilities that include hardware resources made available for use by their clients. However, as the scale and scope of typical data centers has increased, the tasks of provisioning, administering, and managing the physical computing resources have become increasingly complicated.

One concern is the ability of a data center operator to secure data stored at a data center against theft. One way to steal the data is to steal a data storage device on which the data is stored. For example, a data thief may open a network hardware device (e.g., a server) and remove a data storage device that contains client data. The size of data storage devices may make the data storage devices easy to conceal, as compared to concealing a network hardware device, making theft prevention more difficult. For example, a data storage device that stores client information may be small enough to fit in a data thief's pocket.

Figure 1A:
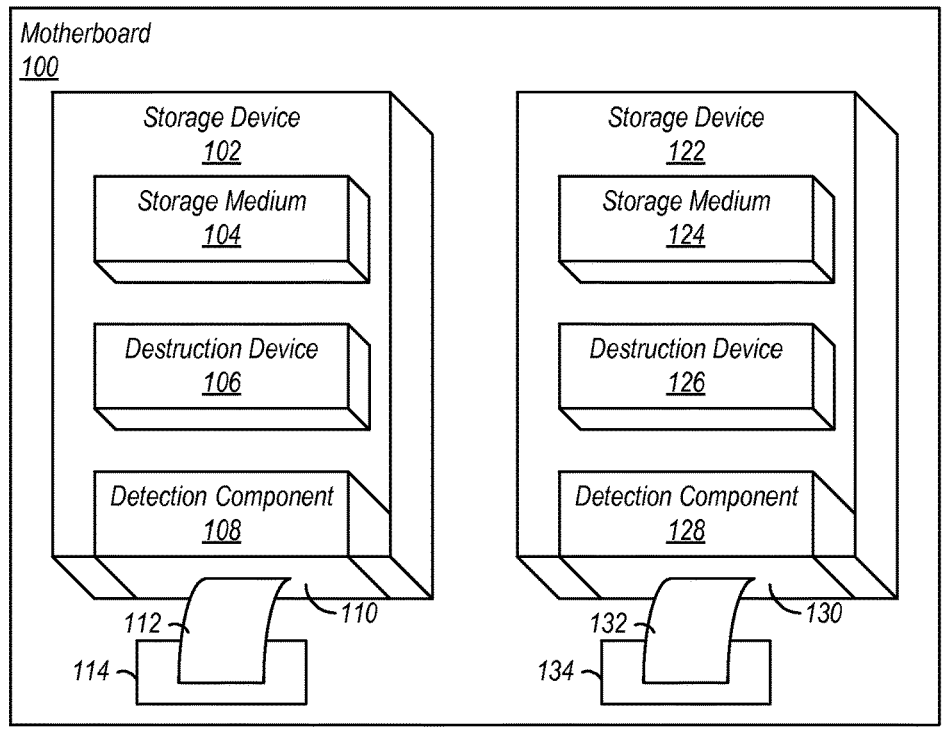
FIG. 1A is a high-level block diagram illustrating operations of an example data protection system.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of systems and methods for providing a data protection system are described herein. The data protection system may destroy data stored at one or more storage mediums to secure the data from being accessed if one or more respective storage devices that include the one or more storage mediums is stolen (e.g., disconnected from another device, removed from an assigned location, or both). The data protection system may include a storage medium, a detection component, a destruction device and another device. In some embodiments, a storage device includes the storage medium, the destruction device, and the detection component. In other embodiments, the detection component is external to the storage device. The detection component may be configured to detect whether the storage device is physically connected to the other device and to output a disconnection signal if the storage device is physically disconnected from the other device. The destruction device may, based on the disconnection signal from the detection component, destroy at least a portion of the data at the storage medium. For example, the destruction device may mechanically damage at least a portion of the storage medium, chemically damage at least a portion of the storage medium, electromagnetically erase at least a portion of contents of the storage medium, or any combination thereof.

In some embodiments, the data protection system includes a signal generator configured to generate a proximity signal. The detection component may be configured to determine whether the storage device has been removed from an assigned location based on the proximity signal (e.g., based on a strength of the proximity signal or a timeout of the proximity signal). In response to the detection component determining that the storage device has been removed from the assigned location, the destruction device may destroy the at least a portion of the data at the storage medium. In some embodiments, the physical connection detection and the proximity signal detection may be combined (e.g., for servicing the storage device) such that the destruction device only destroys the at least a portion of the data at the storage medium in response to the storage device being disconnected from the other device and being removed from the assigned location. Accordingly, the data protection system may help protect data stored at the storage device from being accessed in the event that the storage device is physically stolen.

Figure 1B:
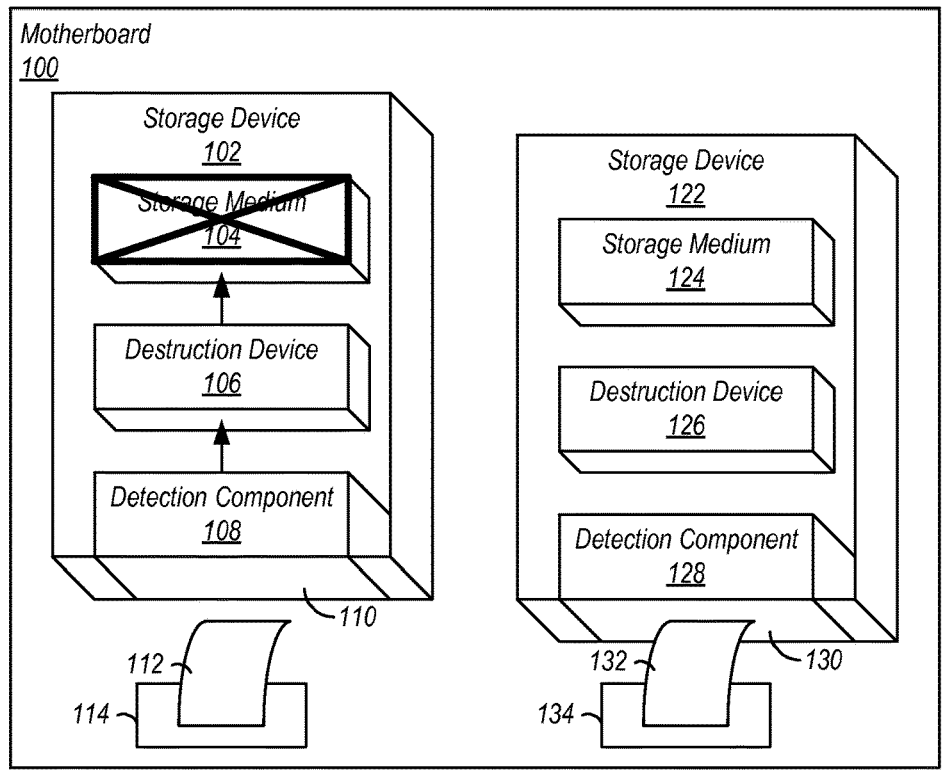
FIG. 1B is a high-level block diagram illustrating an example destruction process of an example data protection system, according to at least some embodiments.

FIGS. 1A-1B are high-level block diagrams illustrating operations of an example data protection system. In this example, the system includes a motherboard 100 configured to connect one or more components of the system, storage devices 102, 122 configured to receive data from and provide data to a plurality of clients, connectors 112, 132 configured to connect the storage devices 102, 122, respectively, to the motherboard 100, and, in some cases, to provide one or more signals to the storage devices 102, 122, respectively, and motherboard interfaces 114, 134 configured to secure the connectors 112, 132, respectively, to the motherboard 100. In some embodiments, the storage devices 102, 122 include storage mediums 104, 124 configured to store the data from the plurality of clients, destruction devices 106, 126 configured to destroy at least a portion of the data stored on the respective storage mediums 104, 124, detection components 108, 128 configured to detect whether the respective storage devices 102, 122 are physically connected to the motherboard 100 (e.g., via the connectors 112, 132), and interfaces 110, 130 configured to secure the connectors 112, 132 to the storage devices 102, 122. In some embodiments, the system of FIGS. 1A-1B may be integrated into a data center, as further described below with reference to FIG. 7.

In some embodiments, the connectors 112, 132 are configured to provide one or more signals to the respective storage devices 102, 122. For example, the connectors 112, 132 may include one or more data cables (e.g., one or more serial advanced technology attachment (SATA) cables) configured to provide one or more data signals to the respective storage devices 102, 122. As another example, the connectors 112, 132 may include one or more power connectors configured to provide power to the respective storage devices 102, 122. In a particular embodiment, the connectors 112, 132 may include one or more dedicated connections configured to connect the motherboard 100 to the respective storage devices 102, 122. The dedicated connections may only provide a presence signal that indicates a connection between the motherboard 100 and the respective storage devices 102, 122 or may not provide any signals between the motherboard 100 and the respective storage devices 102, 122. Although FIGS. 1A-1B illustrates the connectors 112, 132 as single cables, in other embodiments, the connectors 112, 132 may include multiple cables, which may be configured to provide the same signals or different signals to the respective storage devices 102, 122. Additionally, in other embodiments, the connectors 112, 132 may correspond to a mount portion of the motherboard 100 (e.g., rather than including cables).

In some embodiments, the storage devices 102, 122 are computing devices that store and secure data on the respective storage mediums 104, 124. The respective storage mediums 104, 124 may include a form of computer-accessible data storage, such as a solid-state drive (SSD), a hard disk drive (HDD), a magnetic storage device (e.g., magnetic tape), an optical storage device (e.g., a compact disc (CD)), or another form of data storage. Accordingly, as further discussed below with reference to FIG. 9, in a particular embodiment, the storage devices 102, 122 may contain data that respective clients of a network-based storage service may wish to secure from theft (e.g., including theft of the storage devices 102, 122). As discussed above, one way to steal data is to steal a physical storage medium that stores the data. As illustrated by the storage device 102 in FIGS. 1A and 1B, the storage devices 102, 122 may be configured such that if the storage devices 102, 122 are disconnected from the motherboard 100, at least a portion of data stored on the respective storage mediums 104, 124 is destroyed. For example, as illustrated by FIG. 1B, when the interface 110 is disconnected from the connector 112 (disconnecting the storage device 102 from the motherboard 100), at least a portion of the data stored on the storage medium 104 is destroyed. As discussed above, the respective connectors 112, 132 may be power cables configured to provide power to the storage devices 102, 122. In some embodiments, as further discussed below with reference to FIG. 6, the storage devices 102, 122 may include a power source configured to provide power to one or more components of the storage devices 102, 122 (e.g., to the storage mediums 104, 124, the destruction devices 106, 126, the detection components 108, 128, other components, or any combination thereof).

In some embodiments, the detection components 108, 128 are configured to detect whether the storage devices 102, 122 are connected to the motherboard 100 (e.g., via the interfaces 110, 130, the connectors 112, 132, and the motherboard interfaces 114, 134) and to signal a disconnection to the respective destruction devices 106, 126. For example, in the particular embodiment illustrated by FIG. 1B, when the interface 110 is disconnected from the connector 112 (disconnecting the storage device 102 from the motherboard 100), the detection component 108 may detect the disconnection and signal the disconnection to the destruction device 106. The detection components 108, 128 may be electronic devices or may be mechanical devices. For example, in a particular embodiment, the detection components 108, 128 may detect an electrical signal from the motherboard 100 (e.g., transmitted via the connectors 112, 132). As another example, the detection components 108, 128 may be springs which are compressed by a connection of the connectors 112, 132 to the respective interfaces 110, 130. If the connectors 112, 132 are removed from the respective interfaces 110, 130, decompression of the detection components 108, 128 may signal the disconnection to the respective destruction devices 106, 126. As another example, the detection components 108, 128 may be pins which are displaced by the connection of the connectors 112, 132 to the respective interfaces. Other detection mechanisms may additionally or alternatively be used.

The detection components 108, 128 may further be configured to detect a disconnection between the respective connectors 112, 132 and the respective motherboard interfaces 114, 134 or another form of disconnection of the respective storage devices 102, 122 from the motherboard 100. In some embodiments, when the respective connectors 112, 132 include multiple cables, the detection components 108, 128 may be configured to signal a disconnection only when all of the cables have been disconnected. In other embodiments, when the respective connectors 112, 132 include multiple cables, the detection components 108, 128 may be configured to signal the disconnection when a subset (e.g., one or a particular number) of the cables have been disconnected. In some embodiments, the detection components 108, 128 may be integrated into the respective destruction devices 106, 126 or the respective storage mediums 104, 124. In other embodiments, the detection components 108, 128 may be external to the respective storage devices 102, 122 (e.g., affixed to an exterior surface of the respective storage devices 102, 122). In some embodiments, the detection components 108, 128 include a signal property detector that detects characteristics of a signal (e.g., a voltage of the signal, an impedance of a connection that provides the signal, etc.) of the respective connectors 112, 132. In response to a change in a characteristic of the signal, the detection components may be configured to signal the disconnection to the destruction components. For example, the signal property detector may be configured to detect one or more voltages (e.g., 0 volts and 5 volts) provided by the respective connectors. In response to receiving a different voltage (e.g., a 2.5 volt signal), the detection components 108, 128 may be configured to signal a disconnection. Accordingly, in some embodiments, the data protection system may protect the data stored at the storage medium from being improperly accessed (e.g., via one or more taps connected to the connectors 112, 132). Additionally, in some embodiments, the data protection system may destroy the data in response to a degradation of a signal from the connectors 112, 132.

In some embodiments, the destruction devices 106, 126 are configured to destroy at least a portion of the data stored at the respective storage devices 102, 122 (e.g., at the respective storage mediums 104, 124) in response to an indication of a disconnection from the respective detection components 108, 128. For example, in the particular embodiment illustrated by FIG. 1B, when the destruction device 106 receives the indication of the disconnection from the detection component 108, the destruction device 106 may destroy at least a portion of data stored on the storage medium 104. Destroying the at least a portion of the data may include rendering the respective storage mediums 104, 124 nonfunctional. For example, the destruction devices 106, 126 may mechanically damage (e.g., shred, smash, cut, etc.) at least a portion of the respective storage mediums 104, 124, chemically damage at least a portion of the respective storage mediums 104, 124, electromagnetically erase at least a portion of contents of the respective storage mediums 104, 124, or any combination thereof. In some embodiments, destroying the at least a portion of the data may involve powering at least a portion of the respective storage mediums 104, 124 (e.g., spinning a disk platter of a hard disk drive (HDD)). The respective storage mediums 104, 124 may be powered electrically or mechanically (e.g., a spring causes the disk platter to spin). In some embodiments, the destruction devices 106, 126 may be integrated into the respective detection components 108, 128 or the respective storage mediums 104, 124.

In some embodiments, the storage devices 102, 122 may include one or more destruction prevention mechanisms that prevent or override destruction of the at least a portion of the data of the respective storage mediums 104, 124 in response to a disconnection of the storage devices 102, 122 from another device (e.g., so the storage devices 102, 122 can be removed from the motherboard 100 for service). For example, as further described below with reference to FIGS. 6-8, in some embodiments, the destruction devices 106, 126 may be configured only to destroy the at least a portion of the data if the respective storage devices 102, 122 are disconnected from the other device and the respective storage devices 102, 122 lack proximity to a signal generator. As another example, the storage devices 102, 122 may include respective hold pins that prevent the respective destruction devices 106, 126 from destroying the at least a portion of the data. Additionally, the storage devices 102, 122 may include an interface configured to receive a passcode (e.g., in response to a request or within a duration of the disconnection), where if the passcode is received, the destruction of the at least a portion of the data is prevented. In a particular embodiment, if the passcode is not received within a particular duration or if an incorrect passcode is received a particular number of times (e.g., 3 incorrect passcodes), then the destruction devices 106, 126 may be configured to destroy the at least a portion of the data. In some embodiments, the one or more destruction prevention mechanisms may prevent the detection components 108, 128 from signaling the disconnection to the respective destruction devices 106, 126.

Figure 2A:
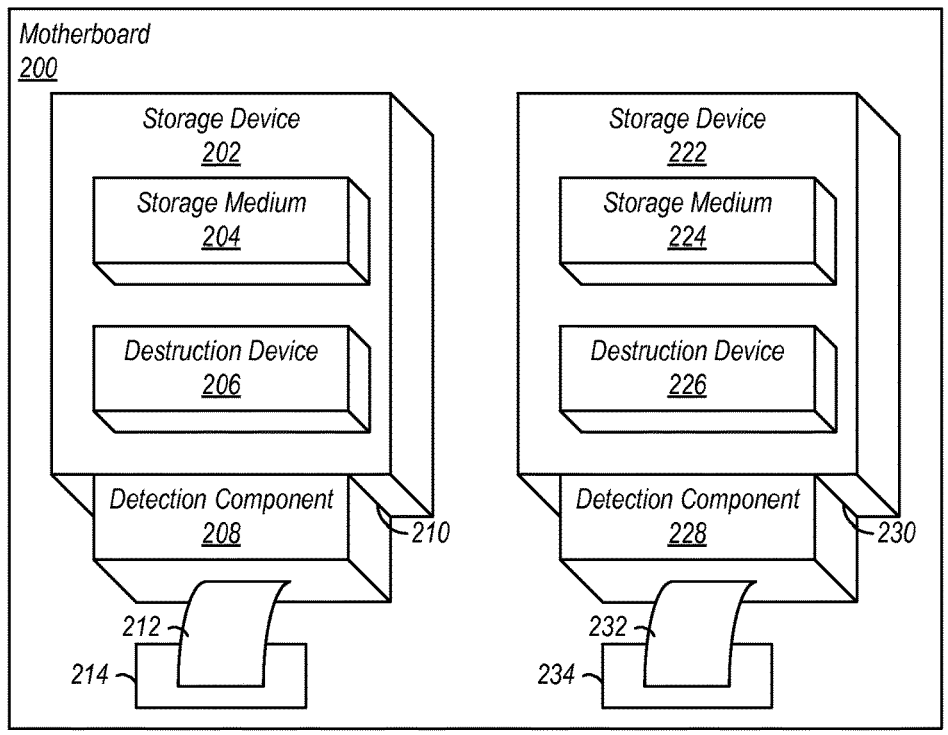
FIG. 2A is a high-level block diagram illustrating operations of an example data protection system.
Figure 2B:
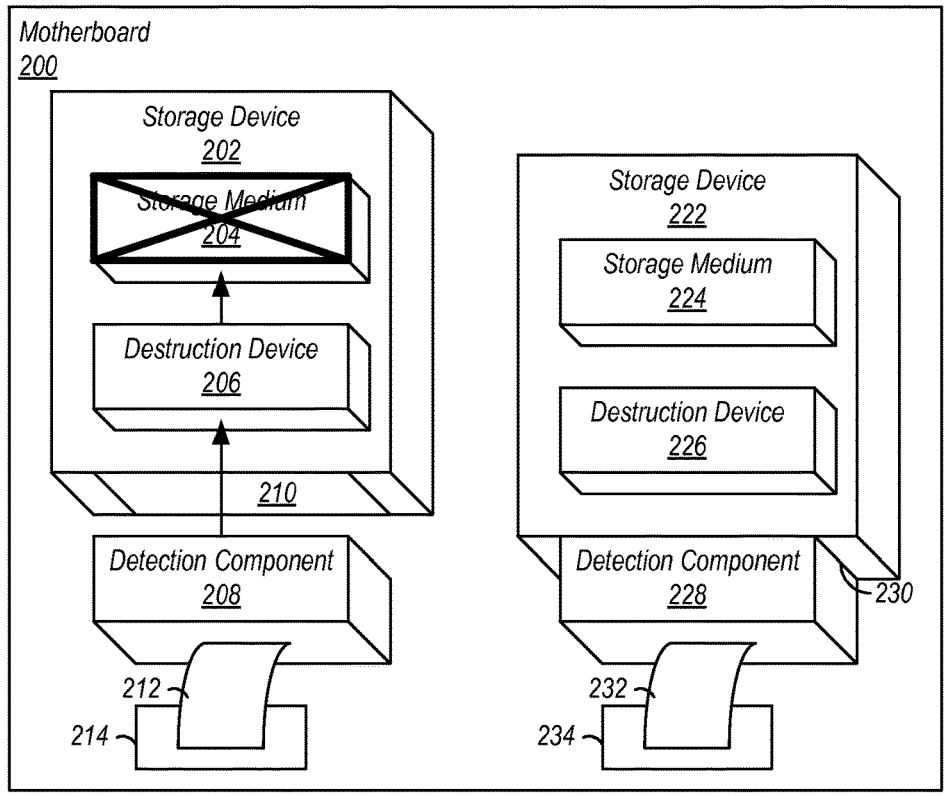
FIG. 2B is a high-level block diagram illustrating an example destruction process of an example data protection system, according to at least some embodiments.

FIGS. 2A-2B are high-level block diagrams illustrating operations of an example data protection system. In this example, the system includes a motherboard 200 configured to connect one or more components of the system, storage devices 202, 222 configured to receive data from and provide data to a plurality of clients, detection components 208, 228 configured to detect respective connections to the respective storage devices 202, 222, connectors 212, 232 configured to connect the detection components 208, 228, respectively, to the motherboard 200, and, in some cases, to provide one or more signals to the storage devices 202, 222, respectively, and motherboard interfaces 214, 234 configured to secure the connectors 212, 232, respectively, to the motherboard 200. In some embodiments, the storage devices 202, 222 include storage mediums 204, 224 configured to store the data from the plurality of clients, destruction devices 206, 226 configured to destroy at least a portion of the data stored on the respective storage mediums 204, 224, and interfaces 210, 230 configured to secure the detection components 208, 228 to the storage devices 202, 222. In some embodiments, the system of FIGS. 2A-2B may be integrated into a data center, as further described below with reference to FIG. 7.

The data protection system of FIGS. 2A-2B may operate similarly to the data protection system described above with reference to FIGS. 1A-1B. However, as illustrated in FIGS. 2A-2B, the detection components 208, 228 are external to the respective storage devices 202, 222. The detection components 208, 228 may be configured to detect whether the storage devices 202, 222 are physically connected to the motherboard 200 (e.g., via the interfaces 210, 230, the detection components 208, 228, the connectors 212, 232, and the motherboard interfaces 214, 234) and to signal a disconnection to the respective destruction devices 206, 226. For example, in the particular embodiment illustrated by FIG. 2B, when the interface 210 is disconnected from the detection component 208 (disconnecting the storage device 202 from the motherboard 200), the detection component 208 may detect the disconnection and signal the disconnection to the destruction device 206. In some embodiments, the detection component 208 may signal the disconnection to the destruction device 206 using a wireless signal. For example, the detection component 208 may signal the destruction device 206 using a radio frequency identification (RFID) signal in response to detecting a disconnection between the detection component 208 and the interface 210. As another example, the detection component 208 may signal the destruction device 206 in response to detecting a disconnection between the detection component 208 and the motherboard 200 (e.g., a disconnection between the detection component 208 and the connector 212). Additionally or alternatively, other detection and signaling mechanisms may be used. In other embodiments, the detection components 208, 228 may be located in another location external to the respective storage devices 202, 222. For example, the detection components 208, 228 may be located within the respective connectors 212, 232 (e.g., the respective connectors 212, 232 may be affixed to the respective interfaces 210, 230). As another example, the detection components 208, 228 may be affixed to (or otherwise integrated into) the motherboard 200.

Figure 3:
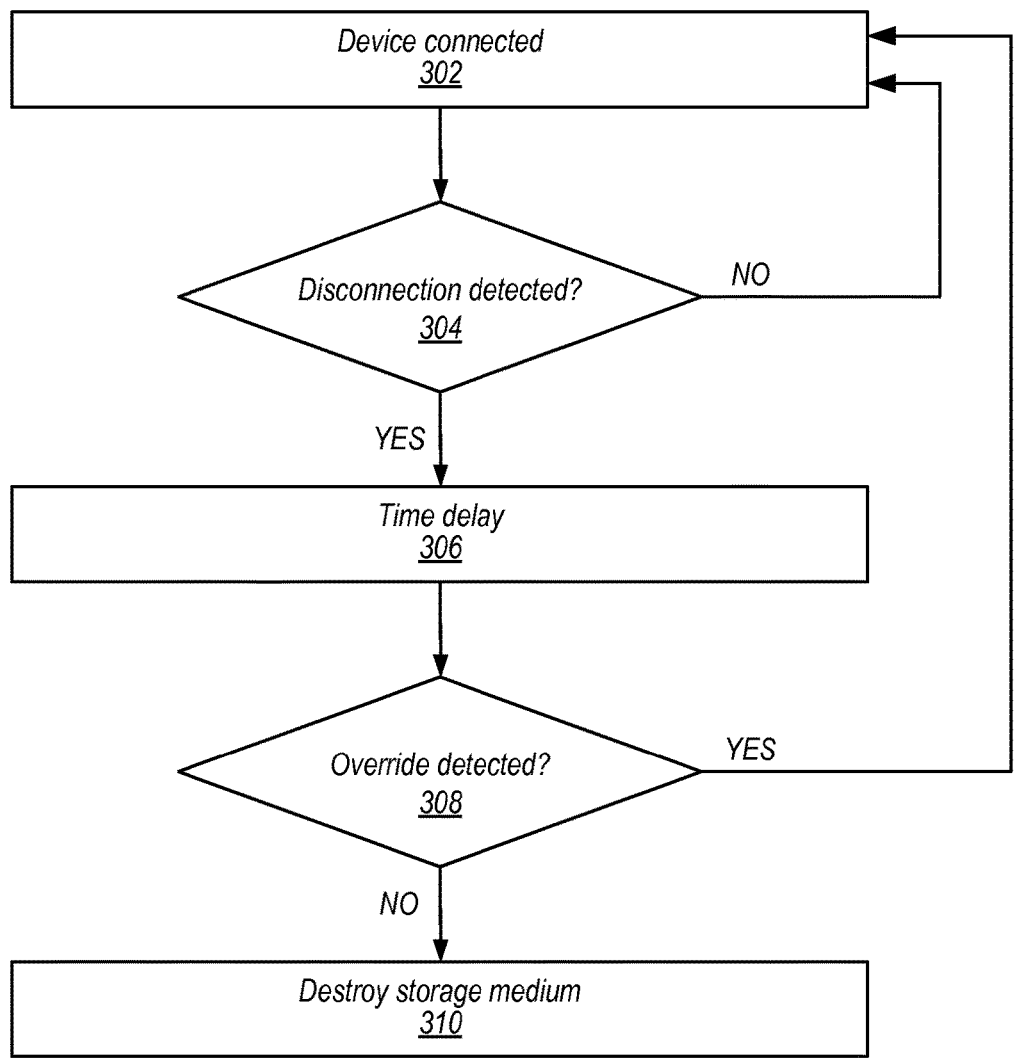
FIG. 3 is a flow diagram illustrating one embodiment of a method for protecting data.

As described above, in one example of a data protection system, a detection component may detect a physical disconnection between a storage device and an external device. In response to the disconnection, the detection component may signal a destruction device, which may destroy at least a portion of data stored on a storage medium of the storage device. The destruction may be prevented or overridden by one or more destruction prevention mechanisms. One embodiment of a method for protecting data is illustrated by the flow diagram of FIG. 3. Although FIG. 3 illustrates operations being performed in a particular order, in other embodiments, some operations may be performed in other orders. Although the method is described below in terms of operations performed by a destruction device, in other embodiments, the method may similarly apply to a detection component configured to initiate a destruction of data stored at a storage medium.

As illustrated at 302, in this example, the method may include a destruction device or mechanism receiving an indication of a connection between a storage device that includes the destruction device and an external device. In some embodiments, as illustrated by FIG. 1A, the indication of the connection may be received at the destruction device 106 from the detection component 108. As another example, as illustrated by FIG. 2A, the indication of the connection may be received at the destruction device 206 from the detection component 208 of FIG. 2A.

As illustrated at 304, in this example, the method may include the destruction device determining whether a disconnection signal indicating that the storage device has been disconnected from the external device has been received. In response to determining that no disconnection signal has been received, the destruction device may determine that no disconnection has been detected and may return to 302. In response to a disconnection signal, the destruction device may determine that a disconnection has been detected. For example, as illustrated by FIG. 1B, the destruction device 106 may receive a disconnection signal from the detection component 108 indicating a physical disconnection between the interface 110 and the connector 112. As another example, as illustrated by FIG. 2B, the destruction device 206 may receive a disconnection signal from the detection component 208 indicating a physical disconnection between the detection component 208 and the interface 210. In other embodiments, the destruction device may determine that a disconnection has been detected based on a lack of a signal from the detection component.

As illustrated at 306, in this example, the method may include, in response to the destruction device determining that a disconnection has been detected, the destruction device may delay a period of time (e.g., 30 seconds) to provide time for one or more destruction prevention mechanisms (e.g., an override mechanism) to be used. For example, the destruction devices 106, 206 of FIGS. 1B and 2B may be configured to wait a period of time in response to receiving a signal from the respective detection components 108, 208 indicating a disconnection between the respective storage devices 102, 202 and the respective motherboards 100, 200. In other embodiments, waiting the period of time may be performed by a detection component (e.g., prior to the detection component sending the disconnection signal to the destruction device).

As illustrated at 308, in this example, the method may include the destruction device determining whether an override mechanism has been detected. For example, as described above with reference to FIGS. 1A-1B, the destruction device 106 may be configured to abort destruction of the at least a portion of the data stored on the storage medium 104 in response to a proximity signal indicating that the storage device 102 is within a threshold distance of an assigned location. Alternatively, as further described with reference to FIG. 8, destruction of the at least a portion of the data may be contingent upon both a detection of a physical disconnection and a detection of a lack of proximity to an assigned location. In response to determining that an override signal has been received, the destruction device may determine that the storage device is not disconnected from the external device (even if such a disconnection is present) and return to 302. Other override mechanisms may include a hold pin, a passcode (e.g., received in response to a passcode request), or another way to indicate that a disconnection between the storage device and the external device is authorized. In some embodiments, no override mechanism is present. In some cases, when no override mechanism is present, the method may immediately proceed to 310 in response to the detection of the disconnection (e.g., without delaying for the period of time).

As illustrated at 310, in this example, in response to an override mechanism not being detected, the method may include the destruction device destroying a corresponding storage medium, all data stored on the corresponding storage medium, or at least a portion of data stored on the corresponding storage medium (e.g., to protect the data from being accessed by an unauthorized person). For example, the destruction devices 106, 206 of FIGS. 1B and 2B may be configured to destroy at least a portion of the data at the respective storage mediums 104, 204 based on no override mechanism being detected. Thus, the method of FIG. 3 may enable protection of at least a portion of data stored at a storage medium.

Figure 4A:
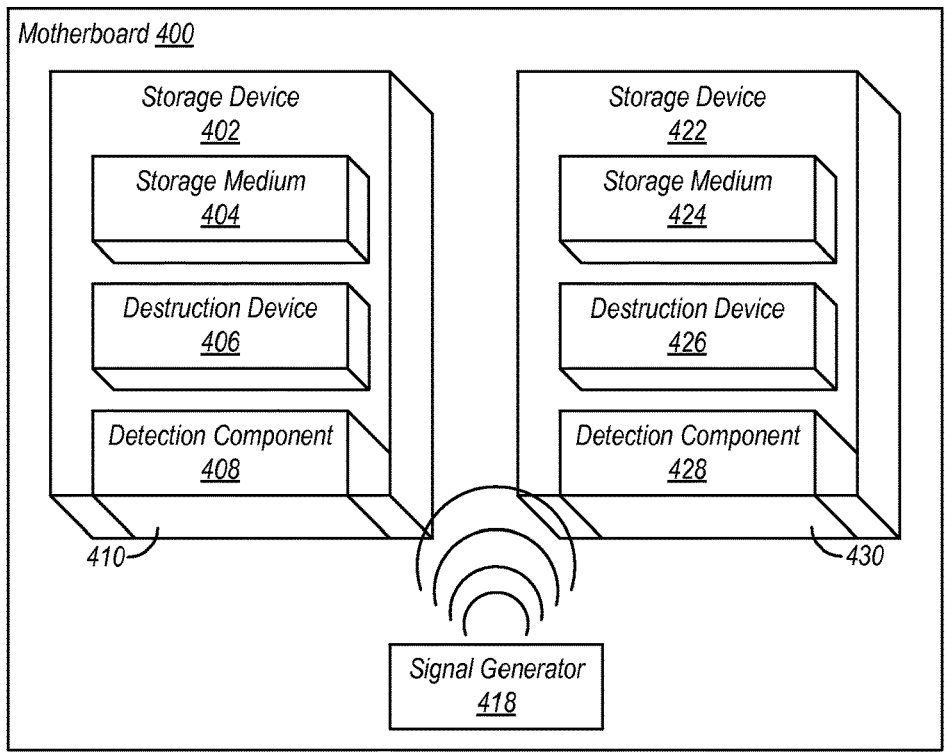
FIG. 4A is a high-level block diagram illustrating operations of an example data protection system.
Figure 4B:
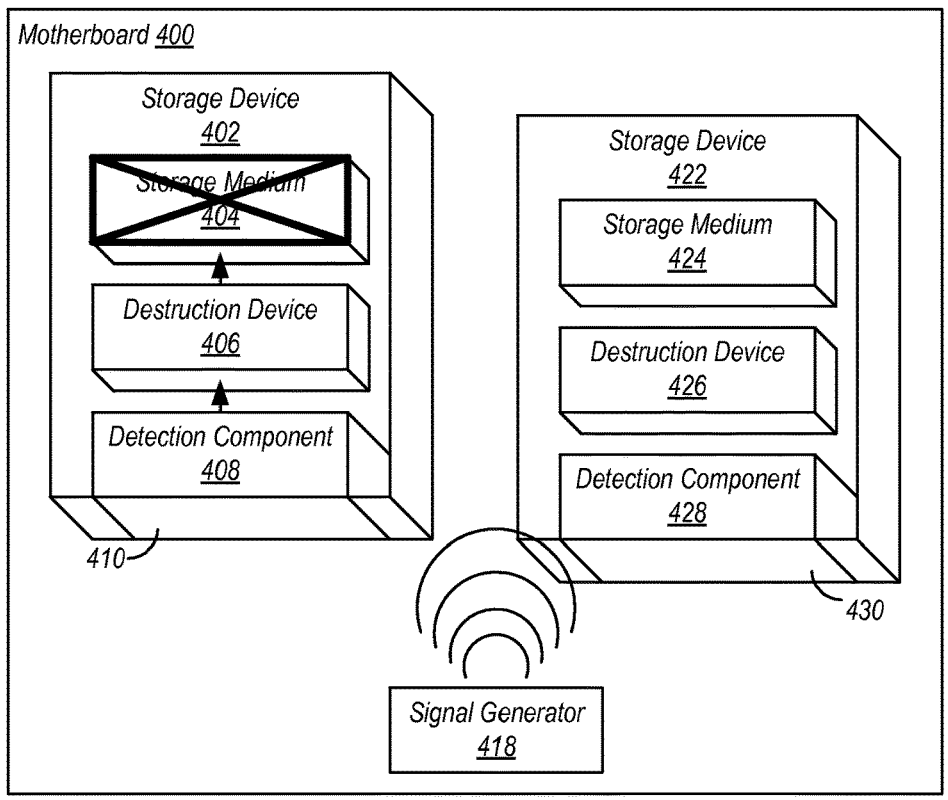
FIG. 4B is a high-level block diagram illustrating an example destruction process of an example data protection system, according to at least some embodiments.

FIGS. 4A-4B are high-level block diagrams illustrating operations of an example data protection system. In this example, the system includes a motherboard 400 configured to connect one or more components of the system, storage devices 402, 422 configured to receive data from and provide data to a plurality of clients, and a signal generator 418 coupled to the motherboard 400 and configured to generate a proximity signal. In some embodiments, the storage devices 402, 422 include storage mediums 404, 424 configured to store the data from the plurality of clients, destruction devices 406, 426 configured to destroy at least a portion of the data stored on the respective storage mediums 404, 424, detection components 408, 428 configured to detect a proximity signal and to determine whether the respective storage devices 402, 422 are at (e.g., within a threshold distance from) an assigned location based on the proximity signal, and interfaces 410, 430 configured to secure the detection components 408, 428 to one or more external connections. In some embodiments, the system of FIGS. 4A-4B may be integrated into a data center, as further described below with reference to FIG. 7.

The data protection system of FIGS. 4A-4B may operate similarly to the data protection system described above with reference to FIGS. 1A-1B. Although some portions of FIGS. 1A-1B are not illustrated, in some embodiments, those portions are present in the system of FIGS. 4A-4B, but have been omitted for clarity. As illustrated in FIGS. 4A-4B, the motherboard 400 is coupled to a signal generator 418 that is configured to generate a proximity signal. In some embodiments, the proximity signal may be a radio frequency identification (RFID) signal, a near field communication (NFC) signal, a wireless local area network (WLAN) signal, an optical signal, an electromagnetic signal, another signaling mechanism, or any combination thereof. For example, the signal generator 418 may be an active RFID tag configured to periodically transmit a beacon signal (e.g., a proximity signal). As another example, the signal generator 418 may be a magnet (e.g., a rare-earth magnet) that produces a magnetic field (e.g., a proximity signal). In some embodiments, the proximity signal may have a short range (e.g., have a signal strength above a threshold signal strength only within one inch of the signal generator 418). In other embodiments, longer ranged signal generators may instead be used. For example, the signal generator 418 may have a range of two yards such that the storage devices 402, 422 may be removed to be serviced. As further described below with reference to FIGS. 6 and 7, in some embodiments, the signal generator 418 may be external to the motherboard 400. In a particular embodiment, the signal generator 418 may be configured to send a kill signal (e.g., in response to a user input) to the detection component 408, the detection component 428, or both. In some embodiments, the motherboard 400 may include multiple signal generators that correspond to one or more respective storage devices. The multiple signal generators may send corresponding proximity signals using corresponding frequencies or may include an identifier in the corresponding proximity signals.

The detection components 408, 428 may be configured to detect the proximity signal (instead of or in addition to detecting a physical connection between the respective storage devices 402, 422 and the motherboard 400, as described above). The detection components 408, 428 may be further configured to determine, based at least in part on the proximity signal, whether the respective storage devices 402, 422 are located within a particular proximity to the signal generator 418 (e.g., whether the storage devices 402, 422 have been removed from an assigned location or a threshold distance from an assigned location). In some embodiments, detecting whether the respective storage devices 402, 422 are within the particular proximity includes the detection components 408, 428 receiving an instance of the proximity signal and determining that a signal strength of the instance of the proximity signal is below a threshold signal strength. In other embodiments, detecting whether the respective storage devices 402, 422 are within the particular proximity includes the detection components 408, 428 failing to detect an instance of the proximity signal or failing to detect an instance having a signal strength that is above the threshold signal strength within a particular time duration. In response to detecting that the respective storage devices 402, 422 are not located within the particular proximity to the signal generator 418, the detection components 408, 428 may issue a destruction signal to the respective destruction devices 406, 426. For example, in the particular embodiment illustrated by FIG. 4B, when the storage device 402 is moved away from the signal generator 418, the detection component 408 may detect the lack of proximity and signal the lack of proximity (e.g., via a destruction signal) to the destruction device 406. In a particular embodiment, in response to receiving the kill signal from the signal generator 418, the detection components 408, 428 may be configured to send the destruction signal to the respective destruction devices 406, 426.

Similar to the destruction devices 106, 126 described above with reference to FIGS. 1A-1B, the destruction device 406 may destroy at least a portion of the data at the storage medium 404 based at least in part on the destruction signal. In some embodiments, the detection components 408, 428, the destruction devices 406, 426, or both may be powered by respective power sources located within the respective storage devices 402, 422. Additionally, in some embodiments, a destruction mechanism of the destruction devices 406, 426 may be overridden or prevented based on one or more destruction prevention or override mechanisms.

Figure 5:
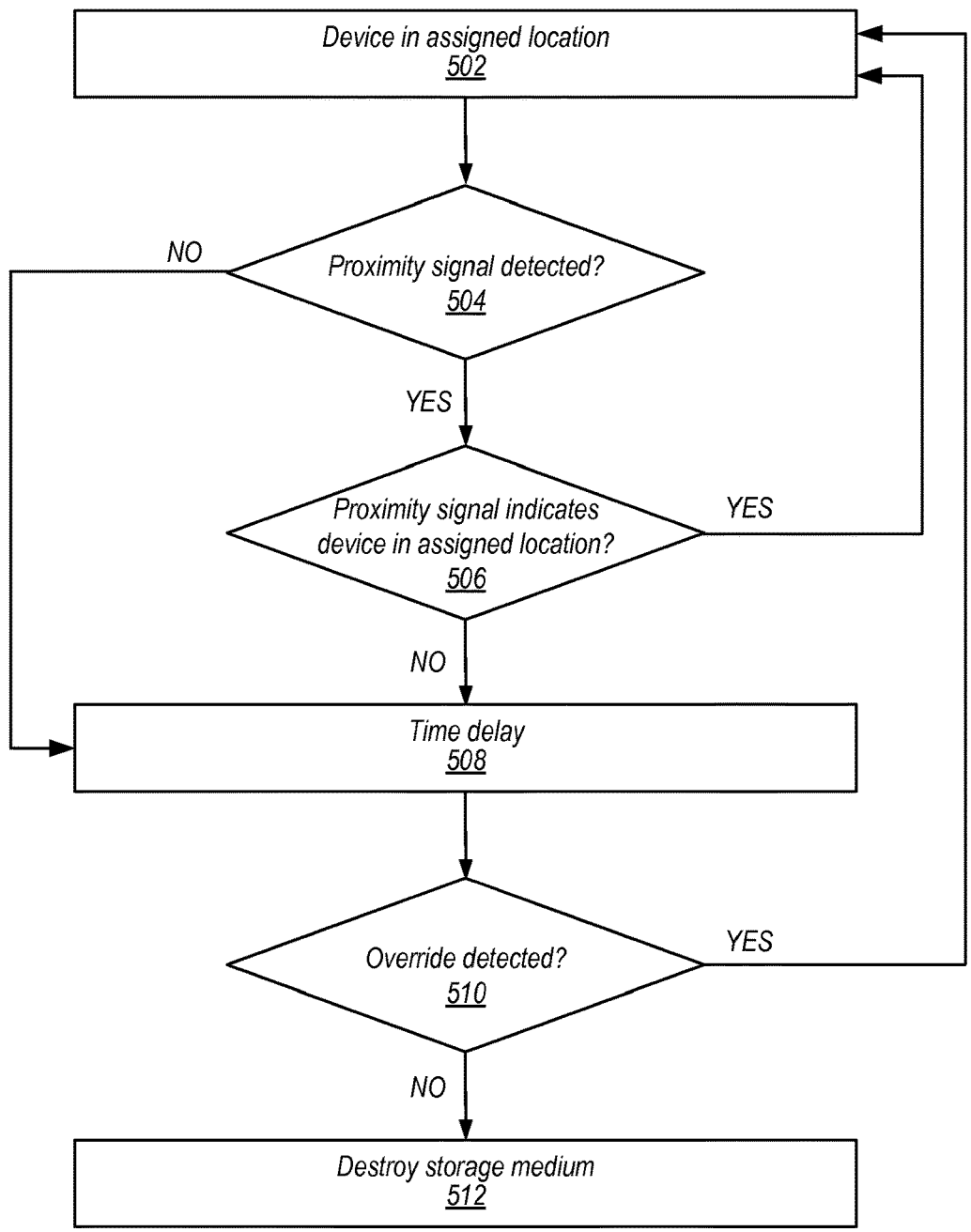
FIG. 5 is a flow diagram illustrating one embodiment of a method for protecting data.

As described above, in one example of a data protection system, a detection component may determine whether a storage device has been removed from an assigned location based at least in part on a proximity signal. In response to detecting that the storage device has been removed from the assigned location, the detection component may signal a destruction device, which may destroy at least a portion of data stored on a storage medium of the storage device. The destruction may be prevented or overridden by one or more destruction prevention mechanisms. One embodiment of a method for protecting data is illustrated by the flow diagram of FIG. 5. Although FIG. 5 illustrates operations being performed in a particular order, in other embodiments, some operations may be performed in other orders. Although the method is described below in terms of operations performed by a detection component, in other embodiments, the method may similarly apply to a destruction device configured to destroy data stored at a storage medium.

As illustrated at 502, in this example, the method may include a detection component (e.g., a proximity detection component) receiving an indication that a corresponding storage device is located at an assigned location (e.g., the signal generator is within a threshold distance from the detection component). In some embodiments, as illustrated by FIG. 4A, the detection component 408 may receive a proximity signal from the signal generator 418 having a signal strength above a threshold signal strength. Based on the proximity signal, the detection component 408 may determine that the storage device 402 is located at an assigned location.

As illustrated at 504, in this example, the method may include the detection component determining whether the proximity signal is detected. In response determining that the proximity signal has not been detected for a particular duration, the detection component may determine that the proximity signal is not detected. The detection component may detect the proximity signal periodically (e.g., in the case of a beacon signal) or continuously (e.g., in the case of a continuous magnetic field). If the detection component is configured to detect the proximity signal periodically, the detection component may determine that the proximity signal is not detected after failing to detect the proximity signal for one period or for a particular number of consecutive periods (e.g., three consecutive periods). As illustrated in FIG. 4B, in response to the storage device 402 being moved away from the signal generator 418, the detection component 408 may fail to detect the proximity signal from the signal generator 418. Accordingly, the detection component 408 may determine that the storage device 402 has been removed from an assigned location.

As illustrated at 506, in this example, the method may include, in response to the detection component detecting the proximity signal, the detection component determining whether the proximity signal indicates that the storage device is (still) located at the assigned location. For example, in response to detecting the proximity signal and determining that a signal strength of the proximity signal is above a threshold signal strength, the detection component may determine that the corresponding storage device is located at the assigned location. However, in response to detecting the proximity signal and determining that the signal strength of the proximity signal is below a threshold signal strength, the detection component may determine that the storage device is at least a threshold distance from the signal generator and that the storage device has been removed from the assigned location. As illustrated in FIG. 4B, in response to the storage device 402 being moved away from the signal generator 418, the detection component 408 may detect that the proximity signal has a signal strength below a threshold signal strength. Accordingly, the detection component 408 may determine that the storage device 402 has been removed from an assigned location.

As illustrated at 508, in this example, the method may include, in response to the detection component determining that the storage device has been removed from the assigned location, the detection component may delay a period of time (e.g., 30 seconds) before sending a destruction signal to a destruction device to provide time for one or more destruction prevention mechanisms (e.g., an override mechanism) to be used. For example, the detection component 408 of FIG. 4B may be configured to wait a period of time in response to determining that the storage device 402 has been moved away from the signal generator 418 (e.g., by at least a threshold distance). In other embodiments, waiting the period of time may be performed by a destruction device or mechanism (e.g., in response to receiving the destruction signal from the detection component).

As illustrated at 510, in this example, the method may include the detection component determining whether an override mechanism has been detected. For example, as described above with reference to FIGS. 1A-1B and 4A-4B, the detection component 408 may be configured to abort destruction of the at least a portion of the data stored on the storage medium 404 in response to a proximity signal indicating that the storage device 402 is physically connected to the motherboard 400. Alternatively, as further described with reference to FIG. 8, destruction of the at least a portion of the data may be contingent upon both a detection of a physical disconnection between and a detection of a lack of proximity to an assigned location. In response to determining that an override signal has been received, the detection component may determine that the storage device is located at the assigned location (even if the storage device has been removed from the assigned location) and return to 502. Other override mechanisms may include a hold pin, a passcode (e.g., received in response to a passcode request), or another way to indicate that a removal of the storage device from an assigned location is authorized. In some embodiments, no override mechanism is present. In some cases, when no override mechanism is present, the method may immediately proceed to 510 in response to the detection component failing to detect the proximity signal or the detection component detecting a proximity signal that indicates that the storage device is not in the assigned location (e.g., without delaying for the period of time).

As illustrated at 510, in this example, in response to an override mechanism not being detected, the method may include the detection component sending a destruction signal to the destruction device. In some embodiments, the destruction signal may initiate destruction of a corresponding storage medium, all data stored on the corresponding storage medium, or at least a portion of data stored on the corresponding storage medium (e.g., to protect the data from being accessed by an unauthorized person). For example, the detection component 408 of FIG. 4B may be configured to send a destruction signal to the destruction device 406, which may be configured to destroy at least a portion of the data at the respective storage medium 404 based on no override mechanism being detected. Thus, the method of FIG. 5 may enable protection of at least a portion of data stored at a storage medium.

Figure 6:
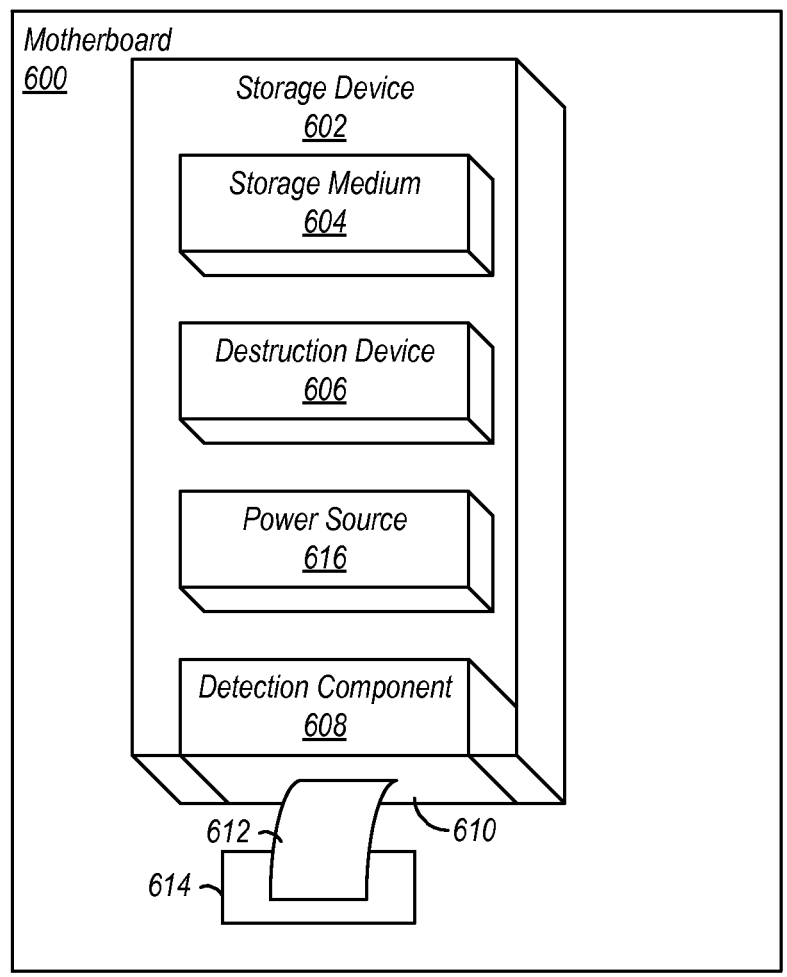
FIG. 6 is a high-level block diagram illustrating operations of an example data protection system.

FIG. 6 is a high-level block diagram illustrating operations of an example data protection system. In this example, the system includes a motherboard 600 configured to connect one or more components of the system, a storage device 602 configured to receive data from and provide data to a plurality of clients, a connector 612 configured to connect the storage device 602 to the motherboard 600, and, in some cases, to provide one or more signals to the storage device 602, a motherboard interface 614 configured to secure the connector 612 to the motherboard 600, and a signal generator 618 configured to generate a proximity signal. In some embodiments, the storage device 602 includes a storage medium 604 configured to store the data from the plurality of clients, a destruction device 606 configured to destroy at least a portion of the data stored on the storage medium 604, a detection component 608 configured to detect a physical connection between the storage device 602 and the motherboard 600, to detect a proximity signal and to determine whether the storage device 602 is at (e.g., within a threshold distance from) an assigned location based on the proximity signal, or both, a power source 616 configured to provide power to the storage medium 604, the destruction device 606, the detection component 608, or any combination thereof, and an interface 610 configured to secure the connector 612 to the storage device 602. Although some portions of FIGS. 1A-1B and 4A-4B are not illustrated, in some embodiments, those portions are present in the system of FIG. 6, but have been omitted for clarity. In some embodiments, the system of FIG. 6 may be integrated into a data center, as further described below with reference to FIG. 7.

The data protection system of FIG. 6 may operate similarly to the data protection systems described above with reference to FIGS. 1A-1B and 4A-4B. For example, the signal generator 618 may be configured to generate a proximity signal that indicates a location of the storage device 602. However, in the illustrated embodiment, the signal generator 618 is external to the motherboard 600 (e.g., as opposed to a system such as the system illustrated in FIGS. 4A-4B where the signal generator 418 is affixed to the motherboard 400). As described further below with reference to FIG. 7, the signal generator 618 may correspond to multiple storage devices or may correspond to a single storage device (e.g., the storage device 602). In other embodiments, the signal generator 618 is affixed to the motherboard 600.

In the illustrated embodiment, the detection component 608 may be configured to detect both a physical connection between the storage device 602 and the motherboard 600 as well as the proximity signal from the signal generator 618. In some embodiments, in response to detecting either a disconnection between the storage device 602 and an external device (e.g., the motherboard 600) or determining based on the proximity signal that the storage device 602 is at least a threshold distance away from the signal generator 618, the detection component 608 may send a destruction signal to the destruction device 606. In other embodiments, separate devices of the storage device 602 are configured to respectively detect the physical connection and the proximity signal and to respectively send signals to the destruction device 606.

In some embodiments, the destruction device 606 may destroy at least a portion of the data stored at the storage medium 604 in response to the destruction signal. In a particular embodiment, the destruction device 606 may only destroy the at least a portion of the data in response to receiving an indication that both the storage device 602 is disconnected from the external device and an indication that that the storage device 602 has been removed from the assigned location. In another embodiment, the destruction device 606 may destroy the at least a portion of the data in response to receiving an indication that both the storage device 602 is disconnected from the external device or an indication that the storage device 602 has been removed from the assigned location.

In some embodiments, the power source 616 may provide power to the storage medium 604, the destruction device 606, the detection component 608, or any combination thereof. In some embodiments, the power source 616 may include a battery, a capacitor, a mechanical power generator (e.g., a spring), another form of power generation, or any combination thereof. As described above, in some embodiments, a condition for triggering the destruction of the at least a portion of the data stored at the storage medium may be a disconnection of the storage device 602 from an external power source. For example, in some embodiments, the connector 612 may provide power to the storage device. In such embodiments, the power source 616 may provide power to the detection component 608 (e.g., so the detection component 608 can detect the disconnection, the proximity signal, or both), to the destruction device 606 (e.g., to power a destruction mechanism), to the storage medium 604 (e.g., to facilitate a destruction process), or any of the above. For example, the power source 616 may power a magnetic degaussing process at the destruction device 606 and may further power a spin of a disk platter of the storage medium 604.

Similar to as described above with reference to FIGS. 1A-1B, the system of FIG. 6 may include one or more destruction prevention mechanisms that prevent or override destruction of the at least a portion of the data of the storage medium 604. For example, as described above, the proximity signal may cause the detection component 608 to refrain from sending a destruction signal to the destruction device 606. As another example, the storage device 602 may include a hold pin that prevents the destruction device 606 from destroying the at least a portion of the data. Additionally, the storage devices 602 may include an interface configured to receive a passcode (e.g., in response to a request or within a duration of the disconnection), where if the passcode is received, the destruction of the at least a portion of the data is prevented. In some embodiments, the one or more destruction prevention mechanisms may prevent the detection component 608 from sending the destruction signal to the destruction device 606 or may prevent the destruction device 606 from destroying the at least a portion of the data (e.g., by negating a destruction mechanism).

Figure 7:
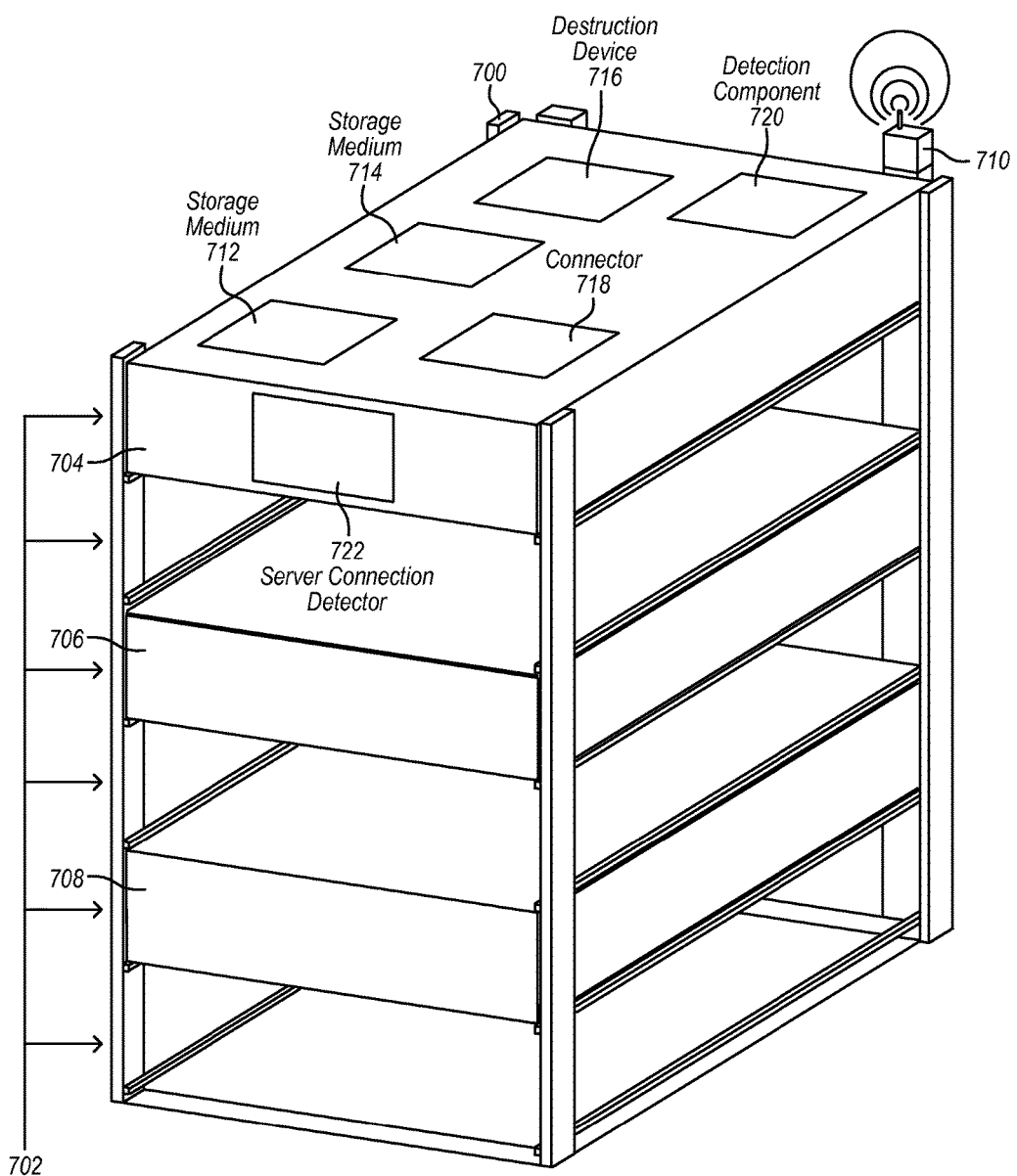
FIG. 7 is a high-level block diagram illustrating operations of one embodiment of a data center that includes an example data protection system.

FIG. 7 is a high-level block diagram illustrating operations of one embodiment of a data center that includes an example data protection system. In this example, the system includes a rack 700 configured to support servers of the data protection system. The rack 700 includes a plurality of server slots 702, where some of the plurality of server slots 702 are occupied by a particular server 704 configured to receive data from and provide data to a plurality of clients, a different server 706, and another server 708. The rack 700 further supports a signal generator 710 configured to generate a proximity signal. In this example, the particular server 704 includes a storage medium 712 configured to store the data from the plurality of clients, a different storage medium 714 configured to store the data from the plurality of clients, a destruction device 716 configured to destroy at least a portion of the data stored on the storage medium 712, on the storage medium 714, or both, a detection component 720 configured to detect a physical connection between the particular server 704 and one or more components of the particular server 704 (e.g., one or more of the storage medium 712, the different storage medium 714, the destruction device 716, and a server connection detector 722), to detect a proximity signal and to determine whether the particular server 704 or one or more components of the particular server 704 including the detection component 720 are at (e.g., within a threshold distance from) an assigned location based on the proximity signal, or both, the server connection detector 722 configured to connect the particular server 704 to an external device, and a connector 718 configured to connect the particular server 704 to one or more components of the particular server 704.

In some embodiments, the storage mediums 712, 714 are computing devices that store and secure data on behalf of one or more clients, as further described below with reference to FIG. 9. The storage mediums 712, 714 may include a form of computer-accessible data storage, such as a semiconductor storage device (e.g., a subscriber identity module (SIM) card or a flash-based storage device such as a universal serial bus (USB) device), a solid-state drive (SSD), a hard disk drive (HDD), a magnetic storage device (e.g., magnetic tape), an optical storage device (e.g., a compact disc (CD)), or another form of data storage. As discussed above, one way to steal data is to steal a physical storage medium that stores the data. Accordingly, the particular server 704 may be configured to destroy or trigger destruction of at least a portion of data stored at the storage mediums 712, 714 in response to detecting a disconnection between the particular server 704 and an external device, in response to detecting a disconnection between the particular server 704 and the storage mediums 712, 714 (or a storage device that includes the storage mediums 712, 714), in response to detecting that the storage mediums 712, 714 have been removed from an assigned location, or any combination thereof. As further described above with reference to FIG. 6, in some embodiments, the particular server 704 may include one or more power sources configured to provide power to one or more components of the particular server 704 (e.g., to the storage mediums 712, 714, the destruction device 716, the detection component 720, the server connection detector 722, other components, or any combination thereof).

In some embodiments, server connection detector 722 is configured to receive one or more signals from one or more external devices (e.g., another server or a server power supply). The server connection detector 722 may be configured to detect a physical disconnection between the particular server 704 and the one or more external devices (e.g., in a manner similar to the detection component 108 detecting the disconnection between the storage device 102 and the motherboard 100 as described above with reference to FIG. 1B). In response to detecting the physical disconnection, the server connection detector 722 may send a server destruction signal to the destruction device 716. In some embodiments, the server destruction signal may be prevented or overridden using one or more destruction prevention mechanisms. Accordingly, the server connection detector 722 may be configured to detect whether the particular server 704 has been (improperly) disconnected. Additionally, in some embodiments, the server connection detector 722 may be configured to detect a proximity signal (from the signal generator 710) and to determine whether the particular server 704 has been removed from an assigned location.

In some embodiments, the detection component 720 is configured to detect whether the storage medium 712 (or a storage device that includes the storage medium 712) is physically connected to the particular server 704 (e.g., via the connector 718), similar to the processes described above with reference to FIGS. 1A-3. Additionally or alternatively, in some embodiments, the detection component 720 is configured to detect a proximity signal from the signal generator 710 and to determine whether a device (e.g., the particular server 704 or a storage device of the particular server 704) that includes the detection component 720 and the storage medium 712 has been removed from an assigned location, similar to the process described above with reference to FIGS. 4A-5. In some embodiments, the detection component 720 is similarly configured to detect whether the different storage medium 714 is physically connected to the particular server 704 and/or a device that includes the detection component 720 and the different storage medium 714 has been removed from an assigned location. In response to detecting a disconnection and/or a lack of proximity to an assigned location, the detection component 720 may send a destruction signal to the destruction device 716. In some embodiments, the destruction signal may be prevented or overridden using one or more destruction prevention mechanisms. Accordingly, the detection component 720 may be configured to detect whether one or more storage mediums has been (improperly) disconnected, removed from an assigned location, or both.

In some embodiments, the destruction device 716 is configured to destroy at least a portion of the data stored at one or more of the storage mediums 712, 714 in response to a server destruction signal, a destruction signal, or both. For example, in some embodiments, in response to a server destruction signal, the destruction device 716 may destroy at least a portion of the data stored at all of the storage mediums 712, 714. However, in response to a destruction signal corresponding to the storage medium 712, the destruction device 716 may be configured to destroy the at least a portion of the data at the storage medium 712 (e.g., without destroying the at least a portion of the data stored at the different storage medium 714). Alternatively, in some embodiments, in response to a destruction signal corresponding to one storage medium (e.g., the storage medium 712), the destruction device 716 may be configured to destroy at least a portion of the data at both the storage medium 712 and the different storage medium 714. In some embodiments, a destruction mechanism used to destroy the at least a portion of the data may be prevented or overridden using one or more destruction prevention mechanisms.

In some embodiments, the particular server 704 may include one or more destruction prevention mechanisms that prevent or override destruction of the at least a portion of the data of the storage mediums 712, 714. For example, in some embodiments, the destruction device 716 may be configured only to destroy the at least a portion of the data if the storage mediums 712, 714 are disconnected from the other device and the storage mediums 712, 714 lack proximity to the signal generator 710. As another example, the destruction device 716 may include a hold pin that prevents the destruction device 716 from destroying the at least a portion of the data. Additionally, the particular server 704 may include an interface configured to receive a passcode (e.g., in response to a request or within a duration of the disconnection), where if the passcode is received, the destruction of the at least a portion of the data is prevented. In some embodiments, the one or more destruction prevention mechanisms may prevent the detection component 720, the server connection detector 722, or both from sending a destruction signal or server destruction signal to the destruction device 716.

Although no storage devices corresponding to the storage devices 102, 202, 402, or 602 of FIGS. 1A-6 are illustrated for clarity, in some embodiments, the particular server 704 may include one or more storage devices that include or are connected to one or more of the components of the particular server 704. Although the detection component 720, the destruction device 716, and the connector 718 are described herein as corresponding to the storage medium 712, in some embodiments, the detection component 720, the destruction device 716, and the connector 718 may correspond to the storage medium 714 or both the storage medium 712 and the storage medium 714. Additionally, in some embodiments, the particular server 704 may include a detection component, a destruction device, and a connector corresponding to the storage medium 714 (e.g., separate devices from the detection component 720, the destruction device 716, and the connector 718).

Although only one rack is illustrated in FIG. 7, in some embodiments, a data center including the rack 700 includes a plurality of racks, each of which may include corresponding servers which may be configured to protect stored data. For example, a different rack may include a different particular server that includes a different destruction device that is configured to destroy a different particular storage medium in response to an indication that a different particular storage device has been removed from the different rack. The indication may be based on a physical disconnection between the different storage device and the different particular server, based on a proximity signal, or both. The destruction mechanism of the different rack may determine whether the device has been removed from an assigned location based on the signal generator 710, based on a rack-level corresponding signal generator, based on a server-level corresponding signal generator, or based on a storage-device level corresponding signal generator. Accordingly, in a particular embodiment, the signal generator 710 may correspond to multiple racks (e.g., every rack in a data center). In some embodiments, when the data center includes multiple signal generators, the signal generators may be configured to provide respective proximity signals using different frequencies (e.g., so a detection component does not incorrectly determine that a corresponding storage device is located at an assigned location due to a different proximity signal). Alternatively, the signal generators may be configured to embed respective signal generator identifiers in respective proximity signals. In some embodiments, the multiple signal generators may be configured to generate a kill signal that causes one or more corresponding detection components (e.g., the detection component 720) to send destruction signals to respective destruction devices. The kill signal may be sent in response to a request or based on a particular user setting. In some embodiments, at least two signal generators may be linked such that a single kill signal request causes all of the at least two signal generators to generate respective kill signals.

Figure 8:
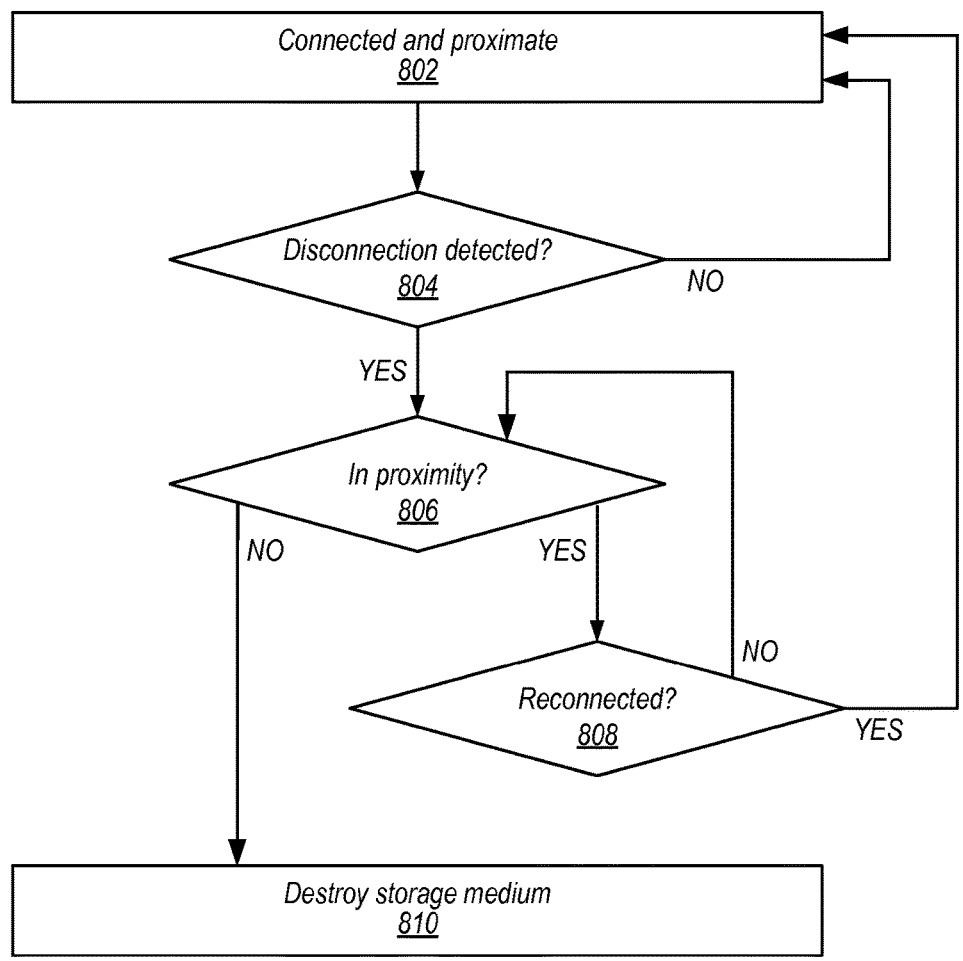
FIG. 8 is a flow diagram illustrating one embodiment of a method for protecting data.

As described above, in one example of a data protection system, a detection component may determine whether a storage device is both connected to an external device and proximate to an assigned location. In response to detecting that the storage device has disconnected from an external device and that the storage device has been removed from the assigned location, the detection component may signal a destruction device, which may destroy at least a portion of data stored on a storage medium of the storage device. The destruction may be prevented or overridden by one or more destruction prevention mechanisms. One embodiment of a method for protecting data is illustrated by the flow diagram of FIG. 8. Although FIG. 8 illustrates operations being performed in a particular order, in other embodiments, some operations may be performed in other orders. Although the method is described below in terms of operations performed by a detection component, in other embodiments, the method may similarly apply to a destruction device configured to destroy data stored at a storage medium.

As illustrated at 802, in this example, the method may include a detection component (e.g., a device that includes a proximity detection component and a connection detection component) receiving an indication that a corresponding storage device is connected to an external device and located at an assigned location (e.g., the signal generator is within a threshold distance from the detection component). In some embodiments, as illustrated by FIG. 7, the detection component 720 may receive an indication that a storage device that includes the storage medium 712 and the detection component 720 is connected to the particular server 704 (e.g., via the connector 718) and may receive a proximity signal from the signal generator 710 having a signal strength above a threshold signal strength. Based on the connection indication and the proximity signal, the detection component 720 may determine that the storage device is connected to the particular server 704 and proximate to an assigned location.

As illustrated at 804, in this example, the method may include the detection component determining whether a disconnection is detected. In response to failing to detect a disconnection (e.g., detection component 720 receives a signal from the particular server 704), the method may return to 802. In response to detecting a disconnection, the method may proceed to 806. For example, the detection component 720 may detect that the connector 718 no longer connects the detection component 720 to the particular server 704 (e.g., because the storage device has been disconnected from the connector 718).

As illustrated at 806, in this example, in response to detecting the disconnection, the method may include the detection component determining whether proximity to an assigned location is detected. In response to determining that a proximity signal has a strength below a threshold signal strength, the detection component may determine that the storage device is not in proximity to an assigned location. Additionally or alternatively, in response determining that a proximity signal has not been detected for a particular duration, the detection component may determine that the storage device is not in proximity to the assigned location. The detection component may detect the proximity signal periodically (e.g., in the case of a beacon signal) or continuously (e.g., in the case of a continuous magnetic field). If the detection component is configured to detect the proximity signal periodically, the detection component may determine that the proximity signal is not detected after failing to detect the proximity signal for one period or for a particular number of consecutive periods (e.g., three consecutive periods). With reference to FIG. 7, in response to a storage device that includes the storage medium 712 and the detection component 720 being moved away from the signal generator 710, the detection component 720 may fail to detect the proximity signal or may detect that the proximity signal has a strength below a threshold signal strength. Accordingly, the detection component 720 may determine that the storage device has been removed from an assigned location.

As illustrated at 808, in this example, the method may include, in response to the detection component detecting that the storage device is in proximity to the assigned location, the detection component detecting whether the storage device has been reconnected to the external device. In response to detecting a reconnection the method proceeds to 802. In response to failing to detect a reconnection, the method proceeds to 806. Accordingly, in some embodiments, the method prevents destruction of the at least a portion of the data unless both the connection to the external device and the proximity to the assigned location are lost (e.g., a destruction prevention or override mechanism).

As illustrated at 810, in this example, in response to detecting the disconnection and in response to detecting a lack of proximity to the assigned location, the method may include the detection component sending a destruction signal to the destruction device. In some embodiments, the destruction signal may initiate destruction of a corresponding storage medium, all data stored on the corresponding storage medium, or at least a portion of data stored on the corresponding storage medium (e.g., to protect the data from being accessed by an unauthorized person). For example, the detection component 720 of FIG. 7 may be configured to send a destruction signal to the destruction device 716, which may be configured to destroy at least a portion of the data at the respective storage medium 712 based on a disconnection between the storage medium 712 and the connector 718 and based on the proximity signal of the signal generator 710. In some embodiments, other override or data destruction prevention mechanisms, such as those described above with reference to FIGS. 3 and 5 may also be used. Thus, the method of FIG. 8 may enable protection of at least a portion of data stored at a storage medium.

Figure 9:
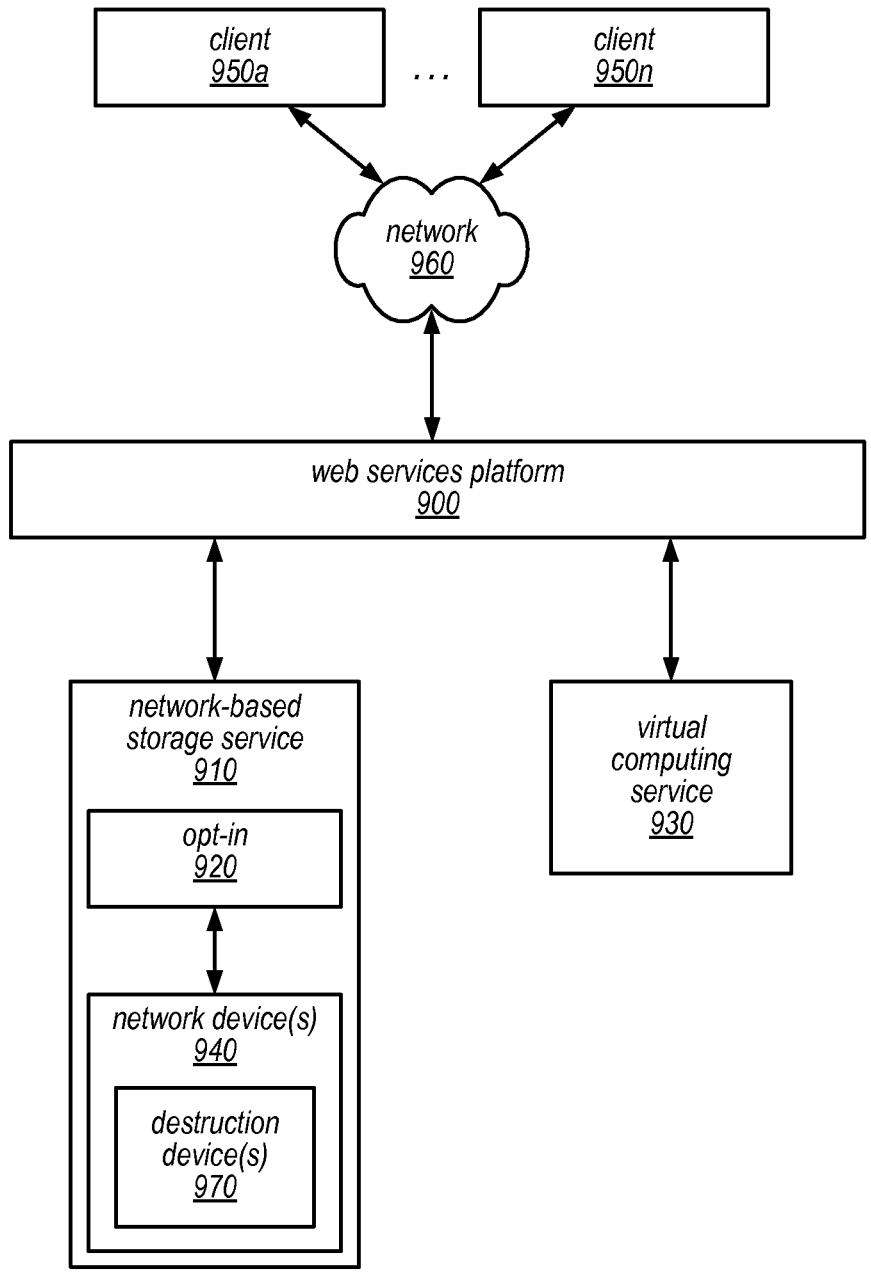
FIG. 9 is a block diagram illustrating a service system architecture that may be configured to implement a data protection system, according to some embodiments.

One embodiment of a service system architecture that may be configured to implement a web services-based storage service including one or more of the systems described by FIGS. 1A-8 is shown in FIG. 9. In the illustrated embodiment, a number of clients (shown as clients 950a-n) may be configured to interact with a web services platform 900 via a network 960. The web services platform 900 may be configured to interface with one or more instances of a network-based storage service 910 and/or a virtual computing service 930. The network-based storage service 910 may include one or more network device(s) 940 configured to store and protect data using one or more respective destruction devices 970, as described above. In some embodiments, the network-based storage service 910 may further include one or more other network devices further configured to store data. Accordingly, in some cases, the network-based storage service 910 provides the data protection system as a data security feature that may be used in response to an opt-in request 920 from one or more respective clients of the clients 950a-n. Additionally, the virtual computing service 930, or another service of the web services platform 900 (e.g., a database service) may also include a similar respective data protection system. It is noted that where one or more instances of a given component may exist, reference to that component herein may be made in either the singular or the plural. However, usage of either form is not intended to preclude the other.

In various embodiments, the components illustrated in FIG. 9 may be implemented directly within computer hardware, as instructions directly or indirectly executable by computer hardware (e.g., a microprocessor, a computer system, or one or more hardware processors), or using a combination of these techniques. For example, the components of FIG. 9 may be implemented by a distributed system including a number of computing nodes (or simply, nodes), such as the computer system embodiment shown in FIG. 10 and discussed below. In various embodiments, the functionality of a given service system component (e.g., a storage service system component) may be implemented by a particular node or distributed across several nodes. In some embodiments, a given node may implement the functionality of more than one service system component (e.g., more than one storage service system component).

Generally speaking, the clients 950a-n may encompass any type of client configurable to submit web services requests to the web services platform 900 via the network 960, including requests to use the network-based storage service 910. For example, a given client 950a may include a suitable version of a web browser, or a plugin module or other type of code module configured to execute as an extension to or within an execution environment provided by a web browser. Alternatively, a client 950 (e.g., a storage service client) may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, the client 950 may be an application configured to interact directly with the web services platform 900. As described herein, the client 950 may be configured to generate web services requests according to a Representational State Transfer (REST)-style web services architecture, a document- or message-based web services architecture, or another suitable web services architecture.

In other embodiments, a client 950 (e.g., a storage service client) may be configured to provide access to web services-based storage to other applications in a manner that is transparent to those applications. For example, the client 950a may be configured to integrate with an operating system or file system to provide storage in accordance with a suitable variant of the data protection system described herein. However, the operating system or file system may present a different storage interface to applications, such as a conventional file system hierarchy of files, directories and/or folders. In such an embodiment, applications may not need to be modified to make use of the data protection system model of FIGS. 1A-8. Instead, the details of interfacing to the web services platform 900 may be coordinated by the client 950 and the operating system or file system on behalf of applications executing within the operating system environment.

The clients 950a-n may convey web services requests to and receive responses from the web services platform 900 via the network 960. In various embodiments, the network 960 may encompass any suitable combination of networking hardware and protocols necessary to establish web-based communications between the clients 950a-n and the web services platform 900. For example, the network 960 may generally encompass the various telecommunications networks and service providers that collectively implement the Internet. The network 960 may also include private networks such as local area networks (LANs) or wide area networks (WANs) as well as public or private wireless networks. For example, both a given client 950a and the web services platform 900 may be respectively provisioned within enterprises having their own internal networks. In such an embodiment, the network 960 may include the hardware (e.g., modems, routers, switches, load balancers, proxy servers, etc.) and software (e.g., protocol stacks, accounting software, firewall/security software, etc.) necessary to establish a networking link between given client 950a and the Internet as well as between the Internet and the web services platform 900. It is noted that in some embodiments, the clients 950a-n may communicate with the web services platform 900 using a private network rather than the public Internet. For example, the clients 950a-n may be provisioned within the same enterprise as the network-based storage service 910. In such a case, the clients 950a-n may communicate with the web services platform 900 entirely through a private network (e.g., a LAN or WAN that may use Internet-based communication protocols but which is not publicly accessible).

Generally speaking, the web services platform 900 may be configured to implement one or more service endpoints configured to receive and process web services requests, such as requests to encode data objects or requests to decode data objects. For example, the web services platform 900 may include hardware and/or software configured to implement a particular endpoint, such that an HTTP-based web services request directed to that endpoint is properly received and processed. In one embodiment, the web services platform 900 may be implemented as a server system configured to receive web services requests (e.g., storage requests and/or opt-in requests 920) from the clients 950a-n and to forward them to components of the network-based storage service 910. Alternatively, the web services requests may be forwarded to another virtual computing service 930 for processing. In other embodiments, the web services platform 900 may be configured as a number of distinct systems (e.g., in a cluster topology) implementing load balancing and other request management features configured to dynamically manage large-scale web services request processing loads. In some embodiments, one or more of the other distinct systems may also use the data protection system described herein. In various embodiments, the web services platform 900 may be configured to support REST-style or document-based (e.g., SOAP-based) types of web services requests.

In addition to functioning as an addressable endpoint for clients' web services requests, in some embodiments, the web services platform 900 may implement various client management features. For example, web services platform 900 may coordinate the metering and accounting of client usage of web services, including storage resources, such as by tracking the identities of requesting clients 950a-n, the number and/or frequency of client requests, the size of objects stored or retrieved on behalf of clients 950a-n, overall storage bandwidth used by clients 950a-n, class of storage requested by clients 950a-n, or any other measurable client usage parameter. The web services platform 900 may also implement financial accounting and billing systems, or may maintain a database of usage data that may be queried and processed by external systems for reporting and billing of client usage activity. In certain embodiments, the web services platform 900 may be configured to collect, monitor and/or aggregate a variety of operational metrics, such as metrics reflecting the rates and types of requests (e.g., opt-in requests 920) received from the clients 950a-n, bandwidth utilized by such requests, system processing latency for such requests, system component utilization (e.g., network bandwidth and/or storage utilization within the storage service system), rates and types of errors resulting from requests, characteristics of requested objects (e.g., size, data type, etc.), or any other suitable metrics. In some embodiments such metrics may be used by system administrators to tune and maintain system components, while in other embodiments such metrics (or relevant portions of such metrics) may be exposed to the clients 950a-n to enable such clients to monitor their usage of the one or more network devices 940 (e.g., via the network-based storage service 910) and/or another virtual computing service 930 (or the underlying systems that implement those services).

In some embodiments, the web services platform 900 may also implement user authentication and access control procedures. For example, for a given web services request to access a particular data object (e.g., an encoded/encrypted data object) stored at the one or more network devices 940, the web services platform 900 may be configured to ascertain whether the client 950 associated with the request is authorized to access the particular data object. The web services platform 900 may determine such authorization by, for example, evaluating an identity, password or other credential against credentials associated with the particular data object, or evaluating the requested access to the particular data object against an access control list for the particular data object. For example, if a client 950 does not have sufficient credentials to retrieve the particular object, web services platform 900 may reject the corresponding web services request, for example by returning a response to the requesting client 950 indicating an error condition. Various access control policies may be stored as records or lists of access control information the network-based storage service 910, the one or more network devices 940 and/or the other virtual computing services 930.

It is also noted that while the web services platform 900 may represent the primary interface through which clients 950a-n may access the features of a storage system that implements the network-based storage service 910, the web services platform 900 need not represent the sole interface to such features. For example, an alternate API that may be distinct from a web services interface may be used to allow clients internal to the enterprise providing the storage service system to bypass the web services platform 900. In another example, a virtual computing service 930 may configured to bypass the web services platform 900 and to implement an API directly between the virtual computing service 930 and a the network-based storage service 910 to store objects used in performing the virtual computing service 930 at the one or more network devices 940 on behalf of a client 950. In some cases, the accounting and/or credentialing services of the web services platform 900 may be unnecessary for internal clients such as administrative clients or between service components within the same enterprise.

Figure 10:
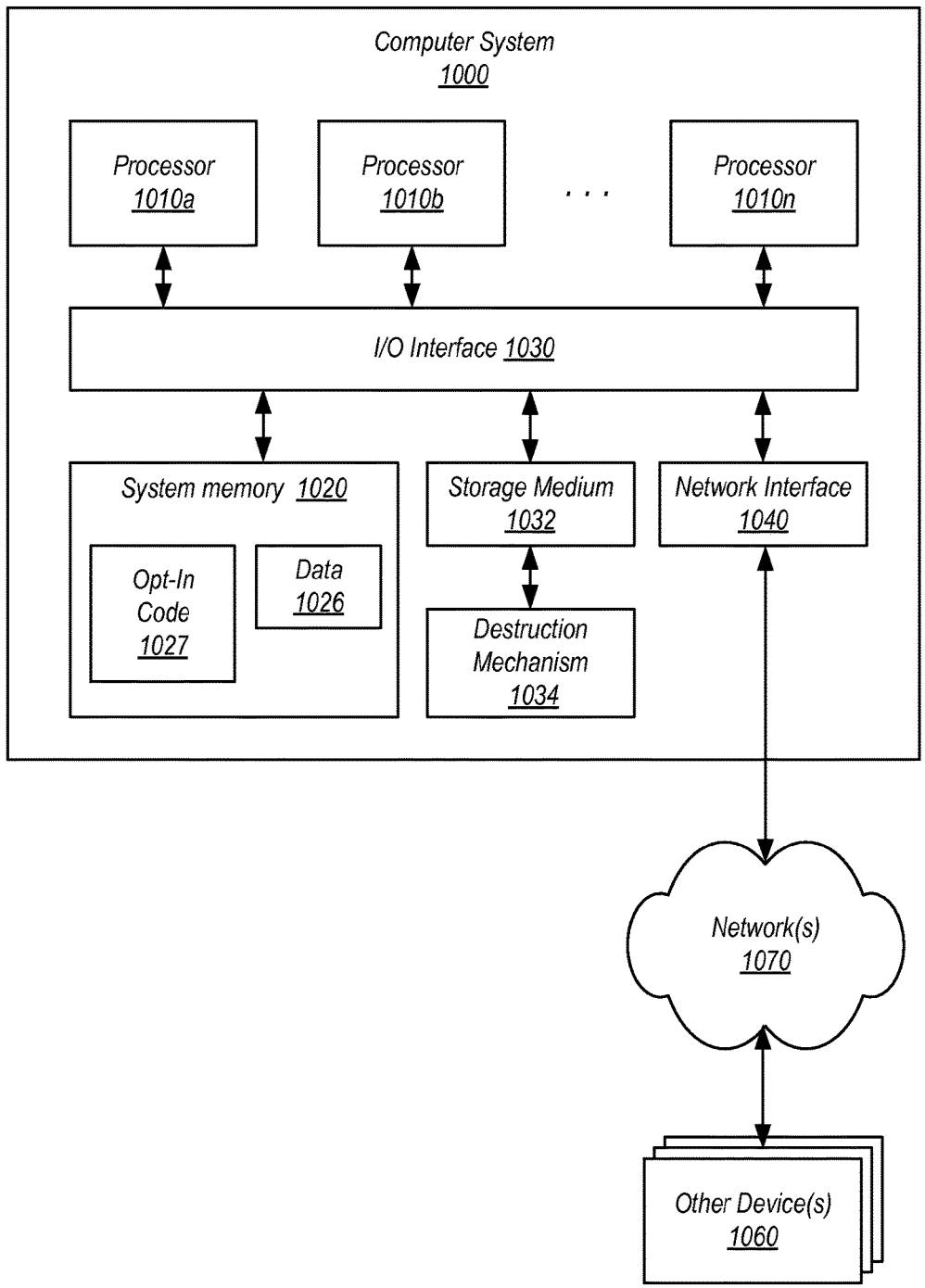
FIG. 10 is a block diagram illustrating one embodiment of a computer system configured to implement at least a portion of a data protection system, as described herein.

One embodiment of a computer system configured to implement at least a portion of a data protection system, such as one of the data protection systems described above with reference to FIGS. 1A-9 is shown in FIG. 10. In at least some embodiments, a computer system that implements a portion or all of the methods and apparatus for data protection as described herein may include a general-purpose computer system that includes or is configured to access one or more computer-accessible media, such as a computer system 1000 illustrated in FIG. 10. In some embodiments, the computer system 1000 corresponds to an individual server of the rack 700 of FIG. 7, multiple servers of the rack 700, or one or more servers of the network-based storage service 910 of FIG. 9. In the illustrated embodiment, the computer system 1000 includes one or more processors 1010a-n coupled to a system memory 1020 and a storage medium 1032 via an input/output (I/O) interface 1030. The computer system 1000 further includes a network interface 1040 coupled to the I/O interface 1030.

In various embodiments, the computer system 1000 may be a uniprocessor system including one processor 1010a, or a multiprocessor system including several processors 1010a-n (e.g., two, four, eight, or another suitable number). The processors 1010a-n may be any suitable processors capable of executing instructions. For example, in various embodiments, the processors 1010a-n may be general-purpose or embedded processors implementing any of a variety of instruction set architectures (ISAs), such as the x86, PowerPC, SPARC, or MIPS ISAs, or any other suitable ISA. In multiprocessor systems, each of the processors 1010a-n may commonly, but not necessarily, implement the same ISA.

System memory 1020 may be configured to store instructions and data accessible by the processor(s) 1010. In various embodiments, the system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data indicating one or more opt-in requests on behalf of one or more clients, are shown stored within the system memory 1020 as opt-in code 1027 and data 1026.

The storage medium 1032 may be configured to store data on behalf of one or more clients based on the opt-in code 1027 and data 1026 stored at the system memory 1020. Additionally, the storage medium 1032 may be connected to a destruction mechanism 1034 configured to destroy at least a portion of the data stored at the storage medium 1032 (e.g., in response to a disconnection between the storage medium 1032 and the I/O interface 1030 or based on a proximity signal, as described above).

In one embodiment, the I/O interface 1030 may be configured to coordinate I/O traffic between a processor 1010, the system memory 1020, the storage medium 1032, and any peripheral devices in the device, including the network interface 1040 or other peripheral interfaces. In some embodiments, the I/O interface 1030 may perform any necessary protocol, timing or other data transformations to convert data signals from one component (e.g., the system memory 1020) into a format suitable for use by another component (e.g., a processor 1010). In some embodiments, the I/O interface 1030 may include support for devices attached through various types of peripheral buses, such as a variant of the Peripheral Component Interconnect (PCI) bus standard or the Universal Serial Bus (USB) standard, for example. In some embodiments, the function of the I/O interface 1030 may be split into two or more separate components, such as a north bridge and a south bridge, for example. Also, in some embodiments some or all of the functionality of the I/O interface 1030, such as an interface to the system memory 1020, may be incorporated directly into a processor 1010.

The network interface 1040 may be configured to allow data to be exchanged between the computer system 1000 and other devices 1060 attached to a network or networks 1070, such as other computer systems or devices as illustrated or described in FIGS. 1A through 9, for example. In various embodiments, the network interface 1040 may support communication via any suitable wired or wireless general data networks, such as types of Ethernet network, for example. Additionally, the network interface 1040 may support communication via telecommunications/telephony networks such as analog voice networks or digital fiber communications networks, via storage area networks such as Fibre Channel SANs, or via any other suitable type of network and/or protocol.

In some embodiments, the system memory 1020 may be one embodiment of a computer-accessible medium configured to store program instructions and data as described above in FIG. 9 for implementing embodiments of detecting an opt-in request for a data protection system. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to the computer system 1000 via the I/O interface 1030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of the computer system 1000 as the system memory 1020 or another type of memory. Further, a computer-accessible medium may include transmission media or signals such as electrical, electromagnetic, or digital signals, conveyed via a communication medium such as a network and/or a wireless link, such as may be implemented via the network interface 1040.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A data center, comprising:
a signal generator configured to generate a proximity signal;
a plurality of storage servers comprising a plurality of storage devices having respective data security mechanisms, each data security mechanism comprising:
a detection component comprising:
a connection detection component configured to:
detect whether a respective storage device of the plurality of storage devices is physically connected to a respective storage server of the plurality of storage servers; and
output a disconnection signal if the respective storage device is physically disconnected from the respective storage server; and
a proximity detection component configured to:
detect the proximity signal;
determine, based at least in part on a detected signal strength of the proximity signal at the storage device, whether the respective storage device is within a threshold distance from the signal generator;
in response to determining that the respective storage device is within the threshold distance from the signal generator, provide an override indication; and
in response to determining that the respective storage device is outside of the threshold distance from the signal generator, refrain from providing the override indication,
wherein the detection component is configured to, in response to the disconnection signal:
send a destruction signal to a storage destruction mechanism in the absence of the override indication;
override sending the destruction signal in response to the override indication, overriding comprising refraining from sending the destruction signal; and
the storage destruction mechanism configured to, in response to receiving the destruction signal from the detection component, destroy at least a portion of data stored on a storage medium of the respective storage device.

2. The data center of claim 1, wherein at least one connection detection component is integrated within a respective storage device of the plurality of storage devices, and
wherein to detect whether the respective storage device is physically connected to a respective storage server, the at least one connection detection component is configured to detect one or more of:
a physical disconnection between the respective storage device and a data connection to the respective storage server,
a physical disconnection between the respective storage device and a power connection to the respective storage server, or
a physical disconnection between the respective storage device and a mount portion of the respective storage server.

3. The data center of claim 1, wherein at least one connection detection component is external to a respective storage device of the plurality of storage devices, and
wherein to detect whether the respective storage device is physically connected to a respective storage server, the at least one connection detection component is configured to detect one or more of:
a physical disconnection between the at least one connection detection component and the respective storage device, or
a physical disconnection between the at least one connection detection component and the respective storage server.

4. The data center of claim 1, wherein at least one connection detection component is integrated into a connector that is configured to be connected to an interface of a respective storage device of the plurality of storage devices, wherein the at least one connection detection component is configured to generate the disconnection signal in response to being physically disconnected from the storage device, and wherein the disconnection signal is a wireless signal.

5. The data center of claim 1, wherein, to destroy the at least a portion of the data stored on the storage medium, the storage destruction mechanism is configured to render the storage medium nonfunctional.

6. The data center of claim 5, wherein, to render the storage medium nonfunctional, the storage destruction mechanism is configured to mechanically damage at least a portion of the storage medium, chemically damage at least a portion of the storage medium, or any combination thereof.

7. The data center of claim 1, further comprising a plurality of computers configured to implement at least a portion of a network-based storage service, wherein the network-based storage service is configured to store respective data objects at the plurality of storage devices on behalf of a plurality of different clients.

8. A storage device, comprising:
   a storage medium configured to store data and provide data in response to access requests to the storage device, wherein the storage device is configured to physically connect to another device;
   a detection component comprising:
      a proximity detection component configured to:
         detect a proximity signal generated by a signal generator;
         determine, based in part on a detected signal strength of the proximity signal at the storage device, whether the storage device is within a threshold distance from the signal generator;
         in response to determining that the storage device is within the threshold distance from the signal generator, provide an override indication; and
         in response to determining that the respective storage device is outside of the threshold distance from the signal generator, refrain from providing the override indication,
      wherein the detection component is configured to, in response receiving a disconnection signal indicating that the storage device has been physically disconnected from the other device:
         send a destruction signal to a storage destruction mechanism in the absence of the override indication; and
         override sending a destruction signal in response to the override indication, overriding comprising refraining from sending the destruction signal; and
   the storage destruction mechanism configured to:
      in response to receiving the destruction signal from the detection component, destroy at least a portion of data stored on the storage medium.

9. The storage device of claim 8, wherein the detection component is configured to receive the disconnection signal from a connection detection component coupled to an interface of the storage device.

10. The storage device of claim 9, wherein the interface is a data interface configured to receive the access requests and the data, and to provide the data.

11. The storage device of claim 9, wherein the interface is a power interface configured to provide power to the storage medium.

12. The storage device of claim 11, further comprising an internal power source, wherein the internal power source is configured to provide power to the storage destruction mechanism when the storage device is disconnected from the other device.

13. The storage device of claim 12, wherein the internal power source is further configured to provide power to the storage medium to facilitate the storage destruction mechanism destroying the at least a portion of the data.

14. The storage device of claim 12, wherein the internal power source comprises a spring-based mechanism, and wherein the internal power source is configured to generate power using a decompression of the spring to facilitate the storage destruction mechanism destroying the at least a portion of the data.

15. The storage device of claim 9, wherein the interface is a dedicated interface configured to indicate a connection to the other device.

16. The storage device of claim 8, wherein the storage destruction mechanism is further configured to, in response to a presence of a hold pin in the storage device, or in response to receipt of a passcode, refrain from destroying the at least a portion of data stored on the storage medium.

17. A method, comprising:
   receiving, at a detection component, an indication of a connection between a storage device and an external device, the storage device including a destruction mechanism;
   after receiving the indication of the connection, receiving, at the detection component, a disconnection signal indicating that the storage device is disconnected from the external device;
   determining, at a proximity detection component of the detection component, whether a proximity signal generated by a signal generator is detected;
   in response to determining that the proximity signal is detected, determining at the proximity detection component, based at least in part on a detected signal strength of the proximity signal, whether the storage device is within a threshold distance from the signal generator;
   in response to determining at the proximity detection component that the storage device is within the threshold distance from the signal generator, providing by the detection component, an override indication;
   in response to determining at the proximity detection component that the storage device is outside of the threshold distance from the signal generator, refrain from providing, by the detection component, the override indication;
   in response to the disconnection signal, the detection component:
      sending a destruction signal to the destruction mechanism in the absence of the override indication, wherein at least a portion of data stored on a storage medium of the storage device is destroyed based at least in part on the destruction signal; and
      refraining from sending the destruction signal in response to the override indication.

18. The method of claim 17, wherein destroying the at least a portion of the data is further based on the destruction mechanism failing to receive a passcode after determining that the connection has been lost, a hold pin being absent within the destruction mechanism, or both.

19. The method of claim 17, wherein detection component is configured to detect the proximity signal periodically, the method further comprising:
   in response to determining that the proximity signal is not detected during a particular time duration, the detection component refraining from providing the override indication.

20. The method of claim 17, further comprising in response to determining that the proximity signal is not detected, the detection component refraining from providing the override indication.

* * * * *